(12) United States Patent
Keefover et al.

(10) Patent No.: US 8,316,830 B2
(45) Date of Patent: Nov. 27, 2012

(54) VALVE MODULE FOR A COMBUSTION ENGINE BREATHING SYSTEM

(75) Inventors: Robert D. Keefover, Lake Orion, MI (US); Murray F. Busato, Clinton Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 148 days.

(21) Appl. No.: 12/599,841

(22) PCT Filed: May 20, 2008

(86) PCT No.: PCT/US2008/064215
§ 371 (c)(1),
(2), (4) Date: Jun. 14, 2010

(87) PCT Pub. No.: WO2008/144686
PCT Pub. Date: Nov. 27, 2008

(65) Prior Publication Data
US 2010/0263618 A1  Oct. 21, 2010

Related U.S. Application Data

(60) Provisional application No. 60/939,138, filed on May 21, 2007.

(51) Int. Cl.
*F02B 47/08* (2006.01)
*F02B 47/10* (2006.01)

(52) U.S. Cl. .............................. 123/568.21; 123/568.24
(58) Field of Classification Search ............ 123/568.21, 123/568.24, 337, 399, 400; 701/108
See application file for complete search history.

(56) References Cited

U.S. PATENT DOCUMENTS

| | | | | |
|---|---|---|---|---|
| 5,460,146 A | * | 10/1995 | Frankenberg | 123/568.21 |
| 5,704,335 A | * | 1/1998 | Akutagawa et al. | 123/337 |
| 6,247,461 B1 | * | 6/2001 | Smith et al. | 123/568.2 |
| 6,378,491 B1 | * | 4/2002 | Ino et al. | 123/337 |
| 6,443,135 B1 | * | 9/2002 | Dismon et al. | 123/568.18 |
| 7,156,376 B2 | | 1/2007 | Bungo et al. | |
| 2001/0023688 A1 | * | 9/2001 | Meilinger et al. | 123/568.21 |

FOREIGN PATENT DOCUMENTS

| | | |
|---|---|---|
| JP | 3-229070 A | 10/1991 |
| JP | 2004-144039 A | 5/2004 |
| WO | WO 2006/137522 A1 | 12/2006 |

OTHER PUBLICATIONS

Written Opinion for PCT/US2008/64215 Form PCT/ISA/237, mailed.
International Search Report for PCT/US2008/64215 Form PCT/ISA/210, mailed.

* cited by examiner

*Primary Examiner* — Mahmoud Gimie
(74) *Attorney, Agent, or Firm* — BrooksGroup

(57) ABSTRACT

A valve module for a combustion engine breathing system, and products and systems using the same.

46 Claims, 7 Drawing Sheets

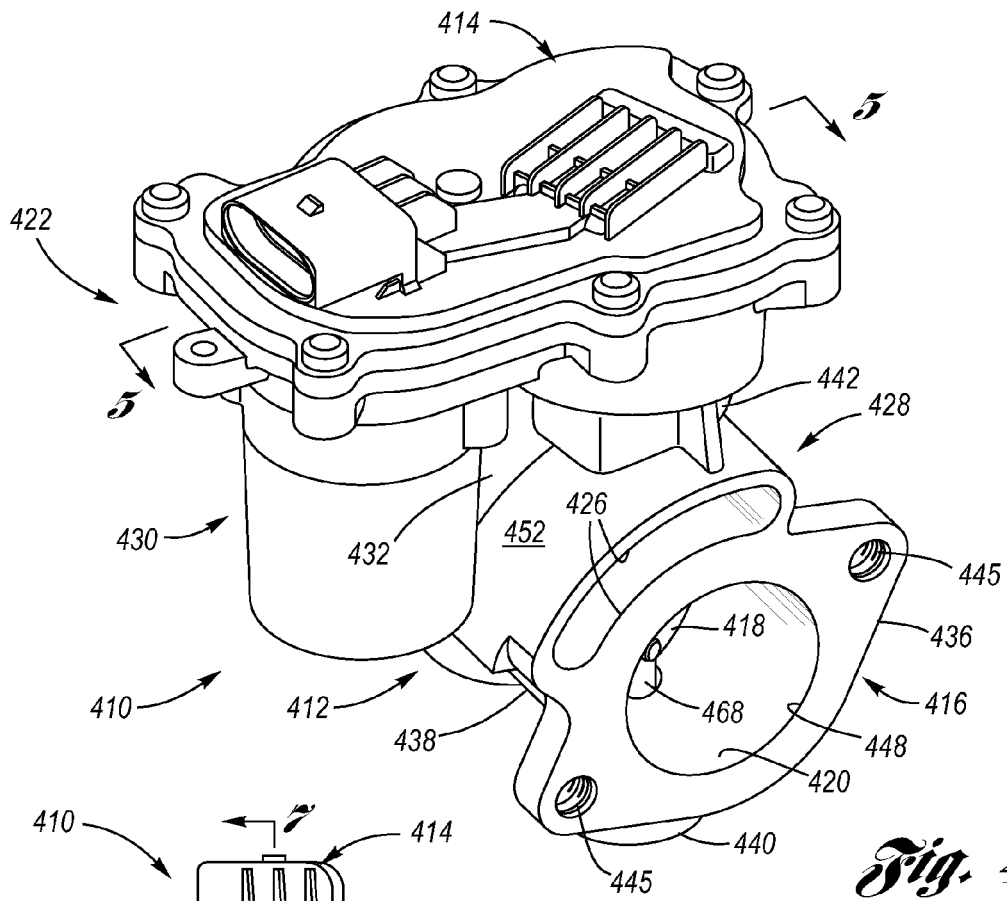
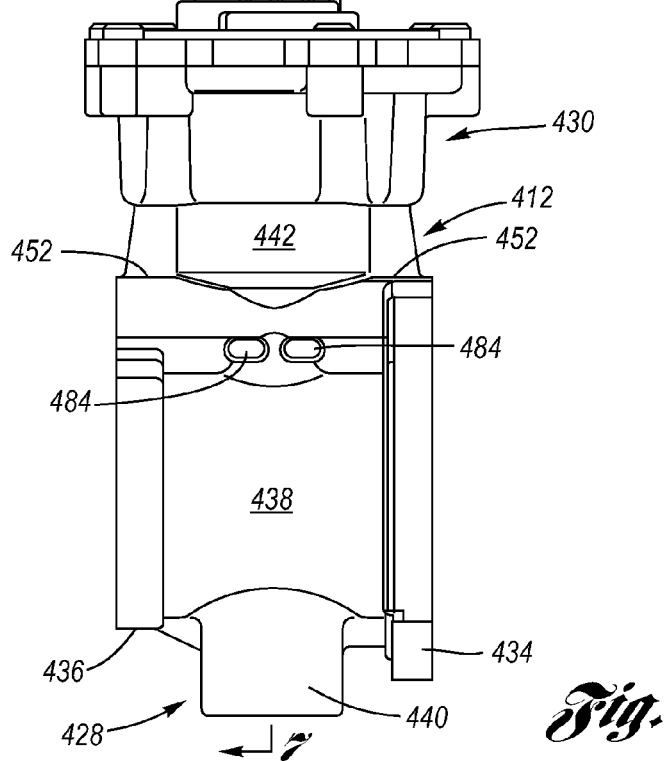
Fig. 4
Fig. 6

VALVE MODULE FOR A COMBUSTION ENGINE BREATHING SYSTEM

This application claims the benefit of U.S. Provisional Application Ser. No. 60/939,138, filed May 21, 2007.

TECHNICAL FIELD

The field to which the disclosure generally relates includes combustion engine breathing systems and, more particularly, a valve module for a combustion engine breathing system.

BACKGROUND

Combustion engines use breathing systems including induction systems for conveying induction gases to engine combustion chambers, and exhaust systems for carrying exhaust gases away from the combustion chambers. The breathing systems may also include exhaust gas recirculation (EGR) passages and valves to recirculate exhaust gases out of the exhaust system and back to the engine via the induction system.

Different valves may be used in such breathing systems to control the flow of gases in the exhaust system, air induction system, or EGR passages therebetween. But such valves typically have components that are sensitive to the flow of high temperature gases, such as actuators, shaft seals, bearings, position sensors, and plastic molded parts. Accordingly, current valves typically include relatively complex heat reduction measures such as liquid cooling, heat shielding, remote mounting of actuators, or expensive materials to achieve suitable durability at high temperatures.

SUMMARY OF EXEMPLARY EMBODIMENTS OF THE INVENTION

One exemplary embodiment of the invention includes a product comprising a valve module for a combustion engine breathing system. The valve module includes a valve assembly, an actuator assembly, a module housing carrying the valve and actuator assemblies and defining an insulating void to limit heat transfer from the valve assembly to the actuator assembly.

Another exemplary embodiment of the invention includes a product for a combustion engine breathing system valve module. The product comprises a unitary module housing including a valve assembly housing, an actuator assembly housing defining a prime mover pocket, and an insulating void to limit the transfer of heat from the valve assembly housing to the prime mover pocket.

Yet another exemplary embodiment of the invention includes a product comprising a combustion engine breathing system valve module. The valve module includes a valve assembly housing including a gas flow passage and one or more recessed surfaces in the gas flow passage, a valve positioned within the gas flow passage, and a prime mover operatively coupled to the valve to move the valve for controlling flow of gas through the gas flow passage. The module also includes a valve sleeve disposed in the gas flow passage and including an inner surface defining a valve passage in which the valve is disposed and an outer surface defining insulating voids in combination with the recessed surface(s) of the valve assembly housing.

A further exemplary embodiment of the invention includes a product comprising a combustion engine breathing system valve module. The valve module includes a valve assembly including a valve carried by a valve shaft to control flow of gas through the valve module, an actuator assembly including a prime mover to actuate the valve via the valve shaft, and a module housing to support the valve and actuator assemblies. The module housing includes a valve assembly housing including opposed mounting flanges, and a valve body extending between the opposed mounting flanges and defining a gas flow passage longitudinally extending therethrough. The module housing also includes a shaft support transversely extending from the valve body and carrying a portion of the valve shaft and at least two shaft seals. The shaft support includes a vent passage transversely extending therethrough in fluid communication between the outside of the module housing and a location within the shaft support between the shaft seals to cool the valve shaft and vent any leakage of gas through the shaft seals.

Other exemplary embodiments of the present invention will become apparent from the detailed description provided hereinafter. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 4 is a rear perspective view of another exemplary embodiment of a valve module;

FIG. 6 is a side view of the valve module of FIG. 4;

DETAILED DESCRIPTION OF EXEMPLARY EMBODIMENTS

The following description of the embodiments is merely exemplary in nature and is in no way intended to limit the invention, its application, or uses.

Figure 1:
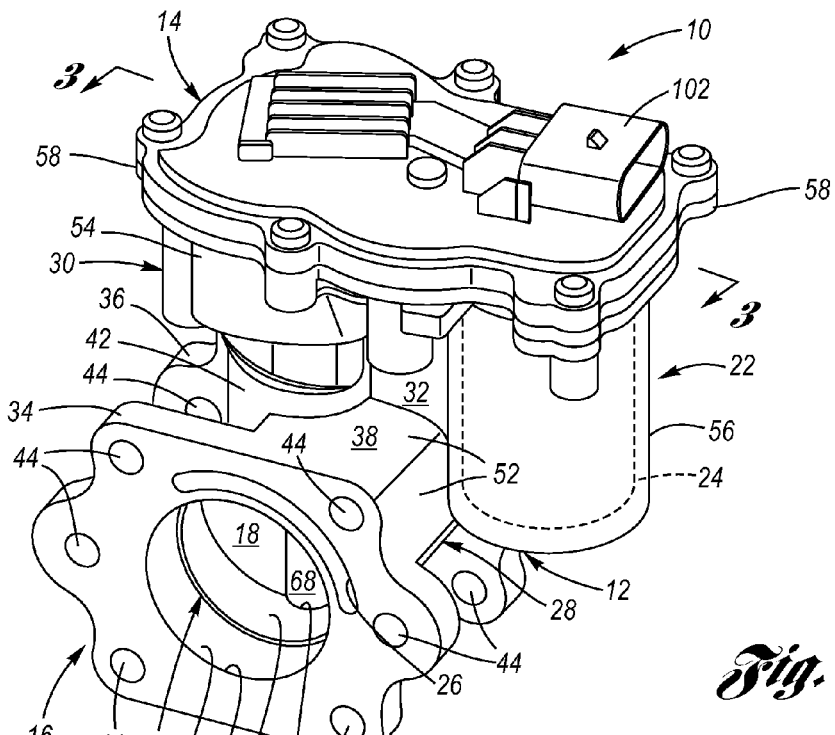
FIG. 1 is a front perspective view of an exemplary embodiment of a valve module, illustrating a housing and a cover.

FIG. 1 illustrates one embodiment of the invention including a combustion engine breathing system valve module 10 that includes low cost integral features to provide suitable valve operation at high temperatures and does not require costly or complex heat transfer devices. The valve module 10 may be an electromechanical device including a module housing 12, and a cover 14, which may be sealingly connected in any suitable manner to the module housing 12 so as to close and protect the interior of the module 10.

Figure 2:
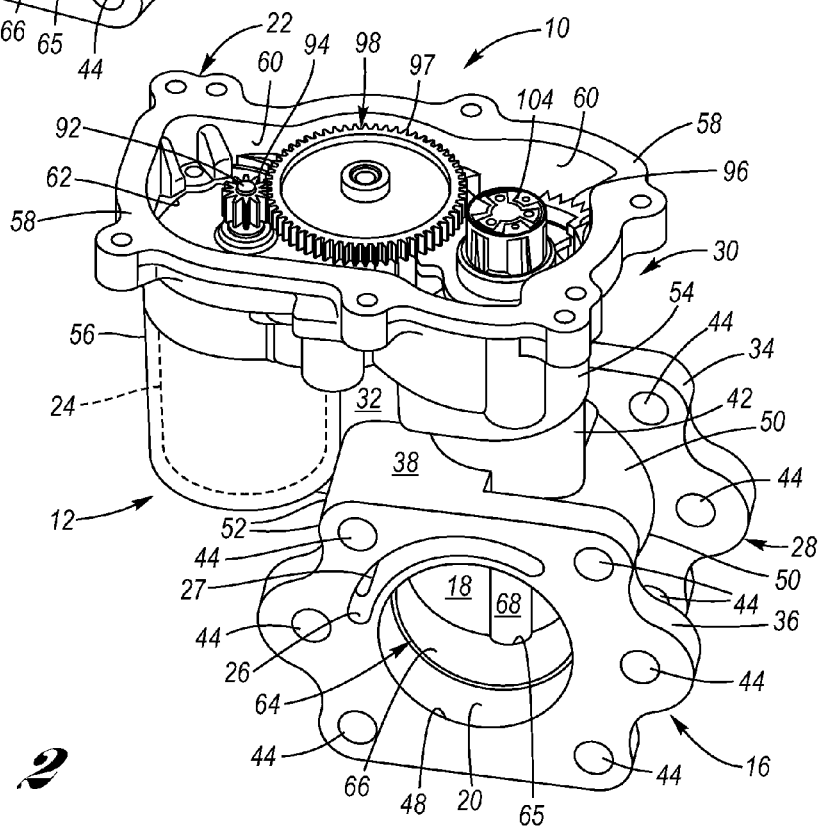
FIG. 2 is a rear perspective view of the valve module of FIG. 1 with the cover removed.

Referring to FIGS. 1 and 2, the module housing 12 may be constructed to carry a valve assembly 16 including a valve 18 disposed in a gas flow passage 20 to regulate flow of gases therethrough. The module housing 12 may also be constructed to carry an actuator assembly 22 including a prime mover 24 operatively coupled to the valve 18 for moving the valve 18 as will be described in further detail below.

Also described in greater detail below, the valve module 10 further includes one or more integral heat isolation features to protect the actuator assembly 22 from hot gases flowing through the valve assembly 16. For example, an insulating void 26 may be disposed between the valve and actuator assemblies 16, 22 and may be open-ended for flow of cooling air therein or therethrough. The insulating void 26 may extend through the housing 12 adjacent the gas flow passage 20. The insulating void 26 interrupts heat transfer and allows the actuator assembly 22 to be positioned in relatively closer proximity to the gas flow passage 20 than if the insulating void 26 were not provided. In other words, without the insulating void 26 there would otherwise be a more direct or continuous heat conduction path between the gas flow passage 20 and the actuator assembly 22 that could potentially damage the prime mover 24 and/or other components. Additional heat isolation features may also be provided, as will be described further herein below.

Still referring to FIGS. 1 and 2, the module housing 12 may be a unitary component made from any of a variety of materials, including cast aluminum or iron, machined stainless steel, or any other suitable corrosion resistant metals, polymers, or composites. The module housing 12 includes a valve assembly housing 28 to support the valve assembly 16, an actuator assembly housing 30 to support the actuator assembly 22, and a web 32 extending therebetween. The actuator assembly housing 30 may be coupled to or integrated with the valve assembly housing 28. For example, the actuator and valve assembly housings 30, 28 may be separate components carried by or fastened to one another. In another example, the actuator and valve assembly housings 30, 28 may be integral with one another such as by being cast or molded together.

Figure 3:
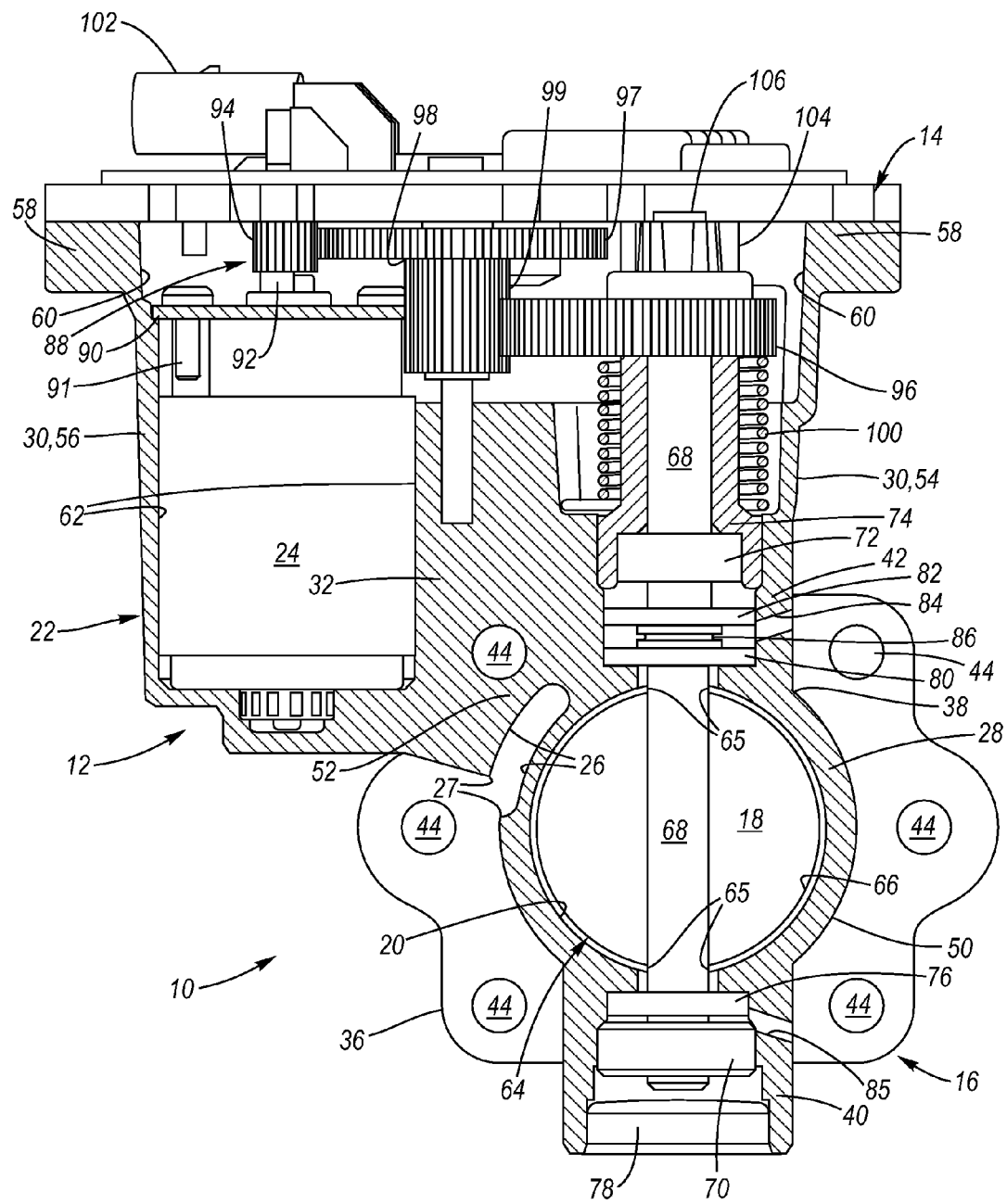
FIG. 3 is a partial cross-sectional view of the valve module shown in FIG. 1, taken along line 3-3 thereof.

In either case, the valve assembly housing 28 may include a first mounting flange 34, a second mounting flange 36, and a valve body 38 extending therebetween with transversely extending shaft supports 40, 42 (FIG. 3). The mounting flanges 34, 36 may include substantially straight upper and lower surfaces and may include multiple, circumferentially aligned fastener passages 44, such as six, extending therethrough for mounting the valve module 10 to other components such as exhaust or EGR pipe flanges, turbocharger flanges, or the like (not shown). The valve assembly housing 28 may also include the gas flow passage 20 longitudinally extending through the valve body 38 from a first opening 46 (FIG. 1) at the first mounting flange 34 to a second opening 48 (FIG. 2) at the second mounting flange 36. The valve body 38 may include a substantially cylindrical portion 50 (FIG. 2), and a mounting flange extension portion 52 extending from the mounting flanges 34, 36 to the web 32.

The insulating void 26 may extend through the valve body 38 from the first mounting flange 34 to the second mounting flange 36. The insulating void 26 may be open to atmosphere to permit air to flow therethrough to reduce heat transfer to the actuator assembly 22 from hot gas flowing through the gas flow passage 20. The insulating void 26 may extend beneath the web 32, and may be arcuately shaped as shown to correspond to the contour of the gas flow passage 20. The insulating void 26 may also include one or more intermediate ports 27 as exemplified in FIGS. 2 and 3. The intermediate port(s) 27 further enable flow of cooling air through the insulating void 26. Heat exchange fins (not shown) may also be carried by the module housing 12 such as on the mounting flange extension portion 52 proximate the insulating void 26 to further facilitate heat rejection within the module housing 12 and thereby further reduce heat transfer to the actuator assembly 22.

The actuator assembly housing 30 may include a drivetrain portion 54 connected to or integral with one of the shaft supports 40 of the valve assembly housing 28, and a prime mover portion 56 integral with the drivetrain portion 54. The actuator assembly housing 30 may include a cover mounting flange 58 adapted for carrying the cover 14 and including fastener passages therethrough. The drivetrain and prime mover portions 54, 56 of the housing 30 may define drivetrain and prime mover pockets 60, 62, as best shown in FIG. 3.

Referring to FIGS. 1 and 2, the valve assembly 12 may include a valve sleeve 64, which may be disposed between the gas flow passage 20 and the valve 18 to define a valve passage 66 in which the valve 18 is disposed. The valve sleeve 64 may include openings 65 such as holes or slots to accommodate a valve shaft 68. The valve 18 may be constructed and arranged to be moved by the actuator assembly 22 to open the valve passage 66, completely close the valve passage 66, partially close the valve passage 66, or any combination thereof. The inner surface of the gas flow passage 20 may be machined for a closer fit with the outer surface of the valve sleeve 64. The valve sleeve 64 may withstand acidic exhaust gas condensation that might otherwise attack and oxidize an aluminum housing and disrupt proper valve movement. The valve sleeve 64 may be finish machined and composed of a suitable material, such as stainless steel, so as to more closely match the thermal expansion characteristics of the valve 18, to ensure more uniform operation over a greater range of temperatures. Nonetheless, the valve sleeve 64 may be omitted and the gas flow passage 20 itself may define the valve passage 66.

The valve 18 may be a round plate or butterfly type of valve and may be composed of stainless steel, and the valve shaft 68 may carry the valve 18 in any suitable fashion and also may be composed of stainless steel. The valve 18 may seal directly against the valve passage 66 to minimize gas leakage when the valve 18 is closed. A relatively high contact angle, for example 15-25° may be used between the valve 18 and valve passage 66 to reduce the potential for binding or sticking of the valve 18 due to thermal expansion of the module housing 12 and/or sleeve 64 and concomitant contraction of the valve passage 66.

Referring to FIG. 3, the valve assembly 12 may additionally include bushings pressed into the shaft supports 40, 42, and constructed and arranged to receive the valve shaft 68. The bushings may include a first bushing 70 disposed in the first shaft support 40 and a second bushing 72 disposed in a support member 74 carried in the second shaft support 42. The bushings 70 may be of any suitable type including ball bearings or a metal ring with bronze and a TEFLON® brand material such as a GARLOCK® brand bushing. A first shaft seal 76 may be disposed in the first shaft support 40 between the first bushing 70 and the valve 18 to prevent leakage of exhaust gas outside the module housing 12. A cup plug 78 may be disposed in the first shaft support 40 to protect the first bushing 76, and may be composed of cold-rolled steel. Second and third seals 80, 82 may be disposed in the second shaft support 42 between the second bushing 72 and the valve 18 to prevent leakage of exhaust gas outside the module housing 12. The seals 76, 80, 82 may be composed of any suitable material, such as a fluorocarbon or TEFLON® brand polymer, or the like.

One or more vent passages 84 may extend transversely through the second shaft support 42 of the module housing 12 in fluid communication between the outside of the module housing 12 and a location in the shaft support 42 between the shaft seals 80, 82. The vent passage(s) 84 may be open to atmosphere to relieve pressure, and allow air to circulate and cool the valve shaft 68 so as to reduce heat transfer from the valve shaft 68 to the actuator assembly 22. The vent passage(s) 84 may also reduce contamination of the actuator assembly 22 in the event of failure of the second shaft seal 80 by allowing contamination to be vented out of the valve module 10. To further reduce the heat conducted into the actuator assembly 22 along the valve shaft 68, one or more reliefs 86 can be added to the valve shaft 68 to interrupt or reduce the shaft cross-sectional area. The relief(s) 86 may include grooves, steps, undercuts, or the like. The vent passage(s) 84 may correspond to such a relief(s) 86 in the valve shaft 68 to further cool the shaft 68.

Similarly, another vent passage 85 may extend transversely through the first shaft support 40 of the module housing 12 in fluid communication between the outside of the module housing 12 and a location in the shaft support 40 between the shaft seal 76 and the bushing 70. The vent passage(s) 85 may be open to atmosphere to relieve pressure, and allow air to circulate and cool the valve shaft 68.

The actuator assembly 22 may include the prime mover 24 disposed in the prime mover pocket 62 of the module housing 12 and a drivetrain 88 disposed in the drivetrain pocket 60 of the housing 12 and configured to transmit torque to the valve shaft 68 and valve 18 upon being driven by the prime mover 24. The prime mover 24 may be any suitable device such as a brush DC-motor, solenoid, pneumatic device, or the like. The prime mover 24 may be retained within its pocket 62 in any suitable fashion, such as by a retainer plate 90, which may be suitably attached to the housing such as by fasteners 91. The prime mover 24 may include an output shaft 92 for coupling to the drivetrain 88.

The drivetrain 88 may include a drive gear 94 coupled to the output shaft 92 of the prime mover 24, a driven gear 96 coupled to the valve shaft 68, and an intermediate gear 98 rotatably carried by the housing 12 between the drive and driven gears 94, 96. In addition to the gears 94, 96, 98, the drivetrain 88 may include any suitable shafts, fasteners, bearings, and the like. The drive gear 94 may be a pinion gear composed of powdered metal, the driven gear 96 may be a sector gear that may be composed of NYLON® brand material and may be molded directly to the valve shaft 68, and the intermediate gear 98 may be a stepped gear that may be composed of any suitable material including plastic. The intermediate gear 98 may include an input diameter 97 adapted to be in mesh with the drive gear 94 and an output diameter 99 adapted to be in mesh with the driven gear 96. The drivetrain ratio of the drivetrain 88 from the drive to driven gears 94, 96 may be suitably selected for any particular application, but an exemplary ratio may be 23:1. The drivetrain ratios may be changed to provide greater or lesser torque or quicker or slower response as desired, such as by swapping different versions of the intermediate gear 98. Moreover, instead of or in addition to the gears 94, 96, 98, the drivetrain 88 may include linkages, levers, or the like. In other words, any suitable type of drivetrain may be used.

Finally, the drivetrain 88 may also include a spring 100, such as a stainless steel torsional spring that may provide two-way fail safe biasing of the valve 18. Accordingly, regardless of which way the valve 18 has been previously rotated, if the prime mover 24 or drivetrain 88 fails or jams, the spring 100 may bias the valve 18 to a pre-set position such as a fully closed or fully open position, or any position therebetween. The spring 100 may also rotationally bias the valve 18 to eliminate or reduce any slack due to tolerances and to prevent the valve 18 from rattling during normal operation of a vehicle. The spring 100 may additionally axially bias the valve shaft 68 and valve 18.

Referring to FIGS. 1 and 3, the cover 14 may be composed of any suitable material including, but not limited to, machined or cast metal, or molded plastic or composite such as a high temperature NYLON. The cover 14 may be crimped, clamped, welded, bolted, screwed, or otherwise carried by the housing 12. The cover 14 may include an electrical connector 102, such as a 5-pin connector composed of any suitable material such as plastic and which may operate as an interface to an engine electronic control unit (not shown) to convey power and electrical signals to components of the module 10 including the prime mover 24 and electronic components as will be described hereafter.

For example, and referring to FIG. 3, a position rotor 104 may be carried by the driven gear 96 to cooperate with a position sensor 106 carried by the cover 14 to provide shaft position feedback for closed loop control of the valve module 10. The rotor 104 and the sensor 106 may be contact or contactless types of devices, depending upon the application and may use any type of position detecting technology. The sensor 106, the connector 102, and electrical connections (not shown) to drive the prime mover 24 and provide position signaling to the connector 102 may be provided in a lead frame assembly (not shown) overmolded within the cover 14.

FIGS. 4-7 illustrate another presently preferred embodiment of a valve module 410. This embodiment is similar in many respects to the embodiment of FIGS. 1 through 3 and like numerals between the embodiments generally designate like or corresponding elements throughout the several views of the drawing figures. Additionally, the descriptions of the embodiments are incorporated by reference into one another and the common subject matter generally may not be repeated here.

Figure 5:
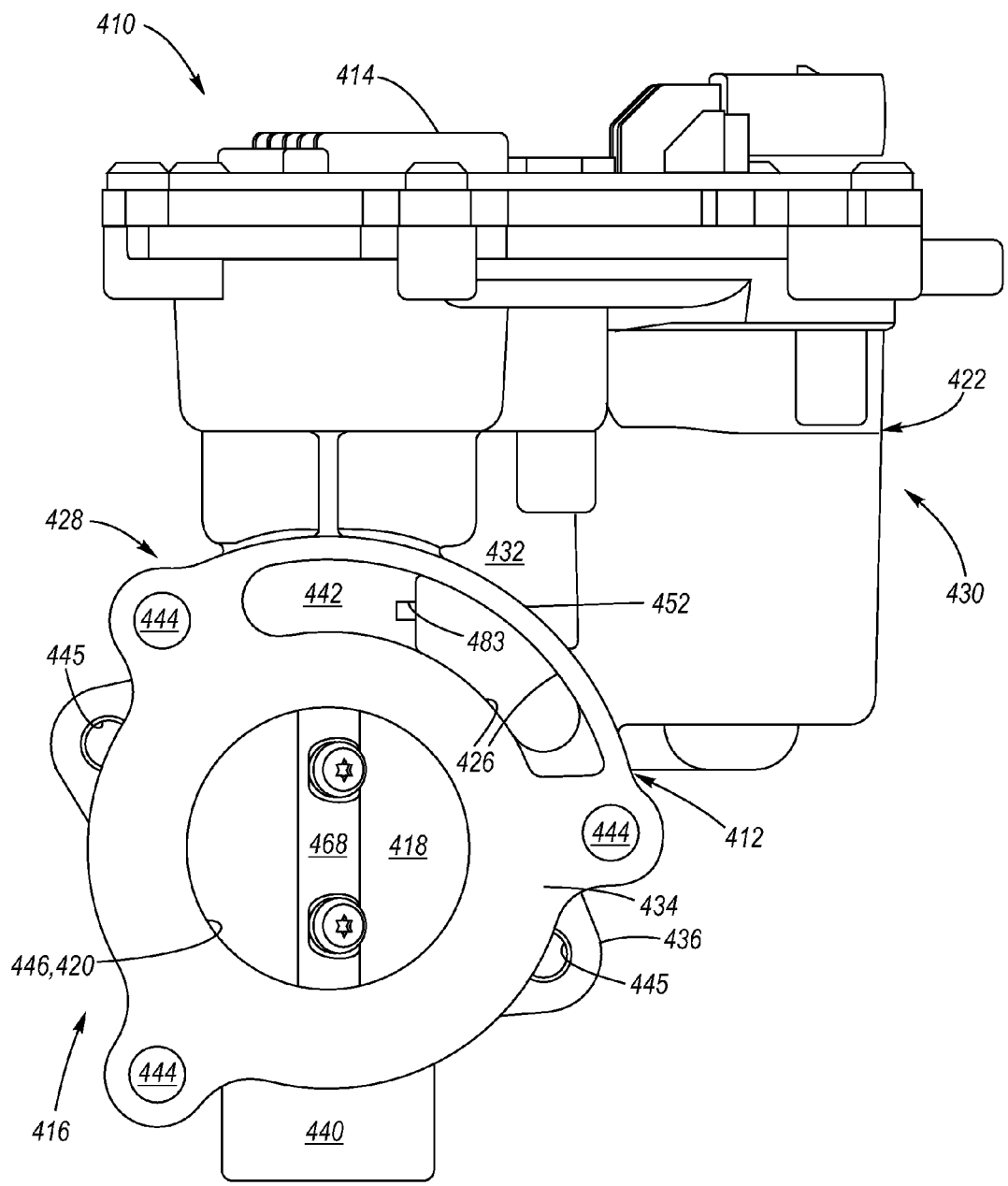
FIG. 5 is a front view of the valve module of FIG. 4.

Referring to FIGS. 4 through 6, the valve module 410 includes a module housing 412 including a valve assembly housing 428 and an actuator assembly housing 430, and a web 432 extending therebetween. The valve assembly housing 428 may include a first mounting flange 434, a second mounting flange 436, and a valve body 438 extending therebetween with transversely extending shaft supports 440, 442.

Referring now to FIG. 5, unlike the straight-sided mounting flanges 34, 36 of the valve module 10 of FIGS. 1-3, the mounting flanges 434, 436 may be curved and, more particularly, may be rounded as shown. The first mounting flange 434 may include three fastener passages 444 extending therethrough, and the second mounting flange 436 may include two fastener passages 445 extending therethrough and being clocked with respect to the three fastener passages 444 to avoid interference during assembly of the module 410 to other components.

Referring to FIGS. 4 and 5, the valve assembly housing 428 also includes a valve passage 420 longitudinally extending through the valve body 438 from a first opening 446 (FIG. 5) at the first mounting flange 434 to a second opening 448 (FIG. 4) at the second mounting flange 436. The valve body 438 may include mounting flange extension portions 452 extending from the mounting flanges 434, 436 to the web 432.

As shown in FIG. 6, one or more vent(s) 484 may be provided in the housing 412 and open to the outside of the valve module 410. The vent(s) 484 may be provided at a portion of the valve module 410 outside of the insulating void (not shown). The vent passage(s) 484 may be open to atmosphere to allow air to circulate and cool the valve shaft 468 (FIG. 5) so as to reduce heat transfer from the valve shaft 468 to the actuator assembly 422.

Figure 7:
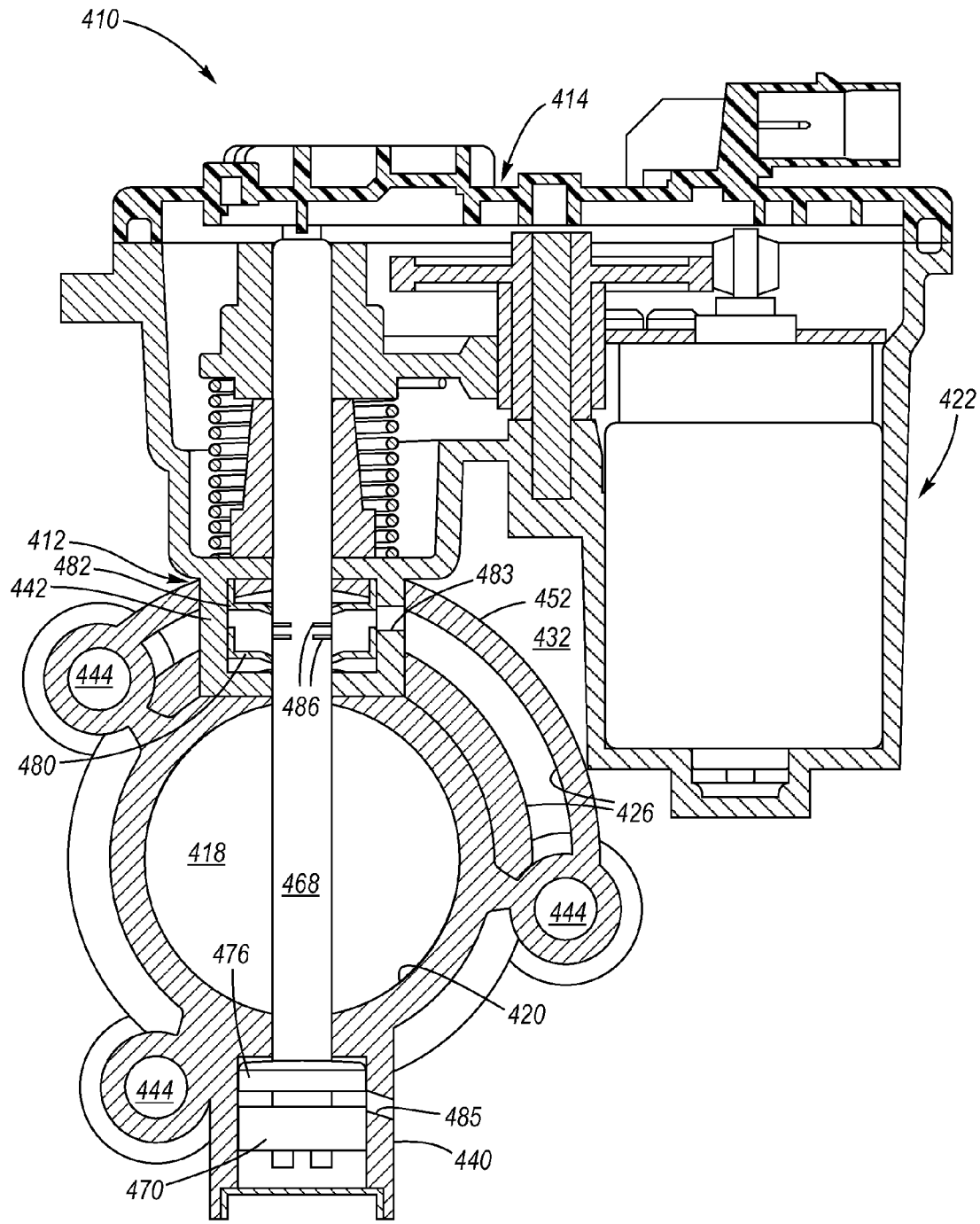
FIG. 7 is a cross-sectional view of the valve module of FIG. 6, taken along line 7-7 thereof.

Referring now to FIG. 7, an insulating void 426 may be formed through the mounting flange extension portion(s) 452 and beneath the web 432 to permit air to flow therethrough from the first mounting flange (not shown) to the second mounting flange (not shown) to reduce the heat transfer from hot gas flowing through the valve passage 420. The insulating void 426 may be open to atmosphere at each mounting flange to allow air circulation through the void 426 to further reduce the amount of heat transfer to the actuator assembly 422. Heat exchange fins (not shown) may also be carried by the housing 412 around the insulating void 426 to further facilitate heat rejection within the housing 412 and thereby reduce heat transfer to the actuator assembly 422.

One or more vent passages 483 may transversely extend through the second shaft support 442 of the module housing 412 from a location in the shaft support 442 between shaft seals 480, 482 to a location outside of the housing 412 and, for example, in fluid communication with the insulating void 426. Accordingly, air flowing through the insulating void 426 may draw any exhaust leakage through the vent passage(s), and may be used to cool the shaft 468 and relieve pressure. Also, the shaft 468 may have one or more reliefs 486 corresponding to the vent passage(s) 483.

Similarly, one or more vent passages 485 may transversely extend through the first shaft support 440 of the module housing 412 to a location outside of the housing 412. The vent passage(s) 485 may located to correspond to a space between a bushing 470 and a seal 476 to relieve pressure therebetween and to cool the shaft 468.

FIGS. 8 through 11 illustrate other presently preferred embodiments of valve modules 810, 910, 1010, 1110. These embodiments are similar in many respects to the embodiments of FIGS. 1 through 7 and like numerals between the embodiments generally designate like or corresponding elements throughout the several views of the drawing figures. Additionally, the descriptions of the embodiments are incorporated by reference into one another and the common subject matter generally may not be repeated here.

According to the embodiments of FIGS. 8 through 11, a gas flow passage sleeve may also be used to further reduce heat conducted to an actuator assembly by minimizing the surface area in direct contact between the sleeve and a module housing and by defining air cavities between the sleeve and the module housing in areas not in direct contact. The air cavities may be of any suitable shape, size, and quantity. Examples are specifically discussed below.

Figure 8:
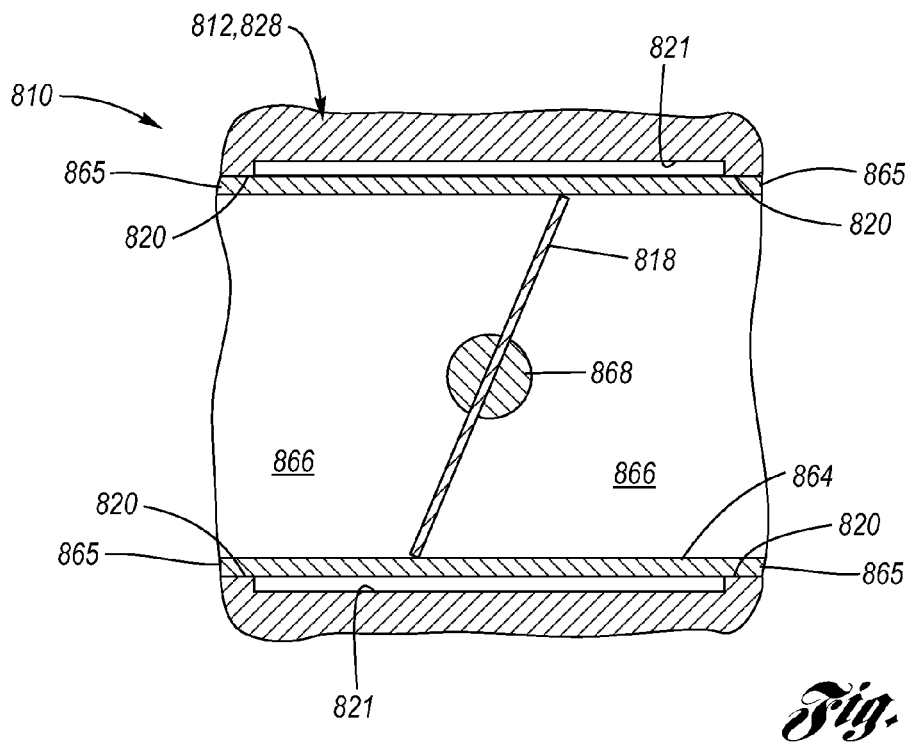
FIG. 8 is a fragmentary cross-sectional view of a first exemplary embodiment of a valve sleeve and module housing arrangement.

For example, FIG. 8 illustrates a portion of a valve module 810 including a valve shaft 868 carrying a valve 818, which is disposed in a valve sleeve 864 carried in a housing 828 of a module housing 812. The housing 828 may have inner surfaces 820 in contact with opposed ends 865 of the sleeve 864, and a recessed inner surface 821, wherein one or more additional insulating voids may be defined between the recessed inner surface 821 of the housing 828 and the sleeve 864.

Figure 9:
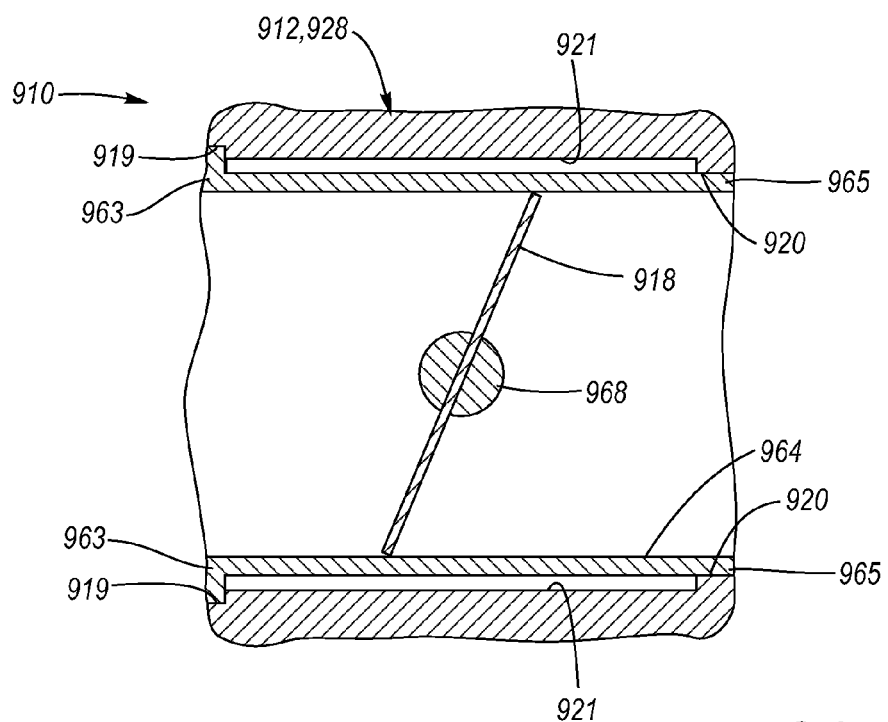
FIG. 9 is a fragmentary cross-sectional view of a second exemplary embodiment of a valve sleeve and module housing arrangement.

Similarly, FIG. 9 illustrates a portion of a valve module 910 including a valve shaft 968 carrying a valve 918, which is disposed in a sleeve 968 carried in a housing 912, 928. The housing 928 may have an inner surface 920 in contact with one end 965 of the sleeve 964, a counterbore inner surface 919 in contact with a flanged end 963 of the sleeve 964, and a recessed inner surface 921 extending axially therebetween. One or more additional insulating voids may be defined between the recessed inner surface 921 of the housing 928 and the sleeve 964.

Figure 10:
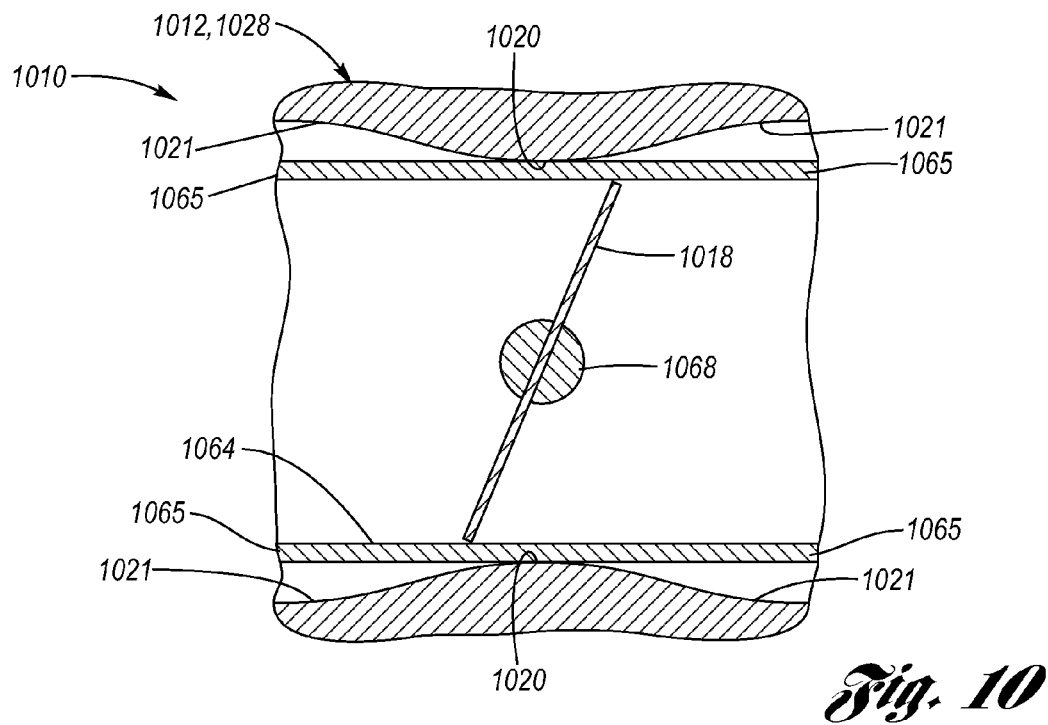
FIG. 10 is a fragmentary cross-sectional view of a third exemplary embodiment of a valve sleeve and module housing arrangement.

In another example, FIG. 10 illustrates a portion of a valve module 1010 including a valve shaft 1068 carrying a valve 1018, which is disposed in a sleeve 1064 carried in a housing 1012, 1028. The housing 1028 may have an inner surface 1020 in contact with the sleeve 1064, and recessed inner surfaces 1021 on either axial side of the inner surface 1020. One or more additional insulating voids may, thus, be defined between the recessed inner surfaces 1021 of the housing 1028 and ends 1065 of the sleeve 1064. Moreover, the one or more additional insulating voids may be open at the opposed axial ends 1065 of the sleeve 1064. Also, and unlike the straight recessed surfaces of FIGS. 8 and 9, the recessed surfaces 1021 may be arcuately contoured.

Figure 11:
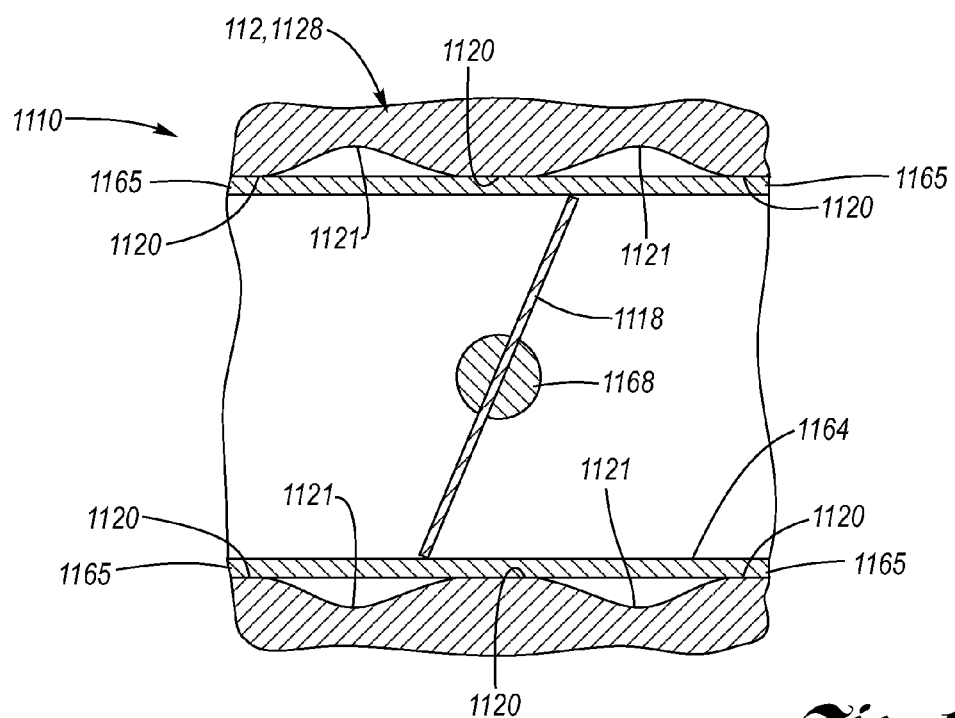
FIG. 11 is a fragmentary cross-sectional view of a fourth exemplary embodiment of a valve sleeve and module housing arrangement.

Similarly, FIG. 11 illustrates a portion of a valve module 1110 including a valve shaft 1168 carrying a valve 1118, which is disposed in a sleeve 1164 carried in a housing 1112, 1128. The housing 1128 may have inner surfaces 1120 in contact with the sleeve 1164, and recessed inner surfaces 1121 axially interspaced between the inner surfaces 1120. One or more additional insulating voids may be defined between the outer surface of the sleeve 1164 and the recessed surfaces 1120 of the housing 1128. Moreover, the one or more additional insulating voids may be closed at opposed axial ends 1165 of the sleeve 1164. Also, the recessed inner surfaces 1121 may be arcuately contoured.

The above description of embodiments of the invention is merely exemplary in nature and, thus, variations thereof are not to be regarded as a departure from the spirit and scope of the invention.

What is claimed is:

1. A product comprising:
a valve module for a combustion engine breathing system, comprising a valve assembly, an actuator assembly, a unitary module housing carrying the valve and actuator assemblies and defining an insulating void to limit heat transfer from the valve assembly to the actuator assembly wherein the valve module further comprises a gas flow passage formed through the unitary module housing and wherein the insulating void is formed through the unitary module, housing.

2. A product as claimed in claim 1 wherein the valve module further comprises a valve disposed in the gas flow passage, and a prime mover operatively coupled to the valve to move the valve for controlling flow of gas through the gas flow passage, wherein the insulating void is disposed between the gas flow passage and the prime mover to limit transfer of heat from the gas flow passage to the prime mover.

3. A product as set forth in claim 2 wherein the valve module further comprises a valve shaft, and wherein the prime mover is constructed and arranged to drive the valve shaft, and the valve is carried by the valve shaft to be rotated thereby to completely close, partially close, partially open, or fully open the gas flow passage.

4. A product as set forth in claim 2 wherein the prime mover includes at least one of a DC motor, torque motor, stepper motor, or pneumatic device.

5. A product as set forth in, claim 1 wherein the insulating void is open-ended and formed through the module housing adjacent the gas flow passage such that air may flow through the insulating void.

6. A product as set forth in claim 5 wherein the insulating void is arcuately shaped to correspond to the contour of the gas flow passage.

7. A product as set forth in claim 1 further comprising a valve shaft extending transversely through the gas flow passage and carrying a valve disposed in the gas flow passage, and a valve assemble housing, the valve assembly housing includes transversely extending shaft supports including a first shaft support carrying a first bushing adapted to support a first end of the valve shaft and a second shaft support carrying a second bushing adapted to support a second end of the valve shaft.

8. A product as set forth in claim 1 wherein the valve module further comprises a valve disposed in the gas flow passage with a contact angle of about 15 to 25°.

9. A product as set forth in claim 1 wherein the module housing comprises a valve sleeve disposed in the gas flow passage.

10. A product as set forth in claim 9, wherein the module housing further comprises recessed surfaces in the gas flow passage to partially define at least one additional insulating void disposed between the valve sleeve and the module housing.

11. A product as set forth in claim 1 wherein the valve module further comprises a sleeve carried in the gas flow passage of the housing.

12. A product as set forth in claim 11 wherein at least one additional insulating void is defined between the sleeve and the housing in the gas flow passage.

13. A product as set forth in claim 12 wherein the at least one additional insulating void is partially defined by at least one recess of the housing in the gas flow passage.

14. A product as set forth claim 13 wherein the at least one recess is substantially straight.

15. A product as set forth in claim 13 wherein the at least one recess is arcuately contoured.

16. The product of claim 1 wherein the module housing further comprises a flange and the insulating void goes through a portion of the flange.

17. The product of claim 1 wherein the insulating void is essentially parallel to air flow through the valve assembly.

18. The product of claim 1 wherein the insulating void follows the flow of air through the valve assembly.

19. The product of claim 1 wherein the valve body is a solid body having gas flow passage and the insulating voids formed therethrough.

20. The product of claim 19 wherein the insulating void is defined by the solid valve body.

21. The product of claim 19 wherein both the insulating void and the gas flow passage are defined exclusively by the solid valve body.

22. The product of claim 1 wherein the unitary module housing is manufactured out of a single material.

23. The product of claim 1 wherein the unitary module housing is injection molded.

24. The product of claim 1 wherein the unitary module housing is cast.

25. The product of claim 1 wherein the unitary module housing is machined out of a single piece of material.

26. The product of claim 1 wherein the unitary module housing is formed out of powdered metal.

27. A product as set forth in claim 1 wherein the insulating void has a first opening and a second opening and formed through the module housing adjacent the gas flow passage such that all the air entering the first opening must exit the second opening.

28. A product comprising:
a valve module for a combustion engine breathing system, comprising a valve assembly, an actuator assembly, a module housing carrying the valve and actuator assemblies and defining an insulating VOID to limit heat transfer from the valve assembly to the actuator assembly
wherein the module housing includes a valve assembly housing that defines a gas flow passage extending therethrough further comprising:
a valve shaft extending transversely through the gas flow passage and carrying a valve disposed in the gas flow passage, wherein the valve assembly housing includes transversely extending shaft supports including a first shaft support carrying a first bushing adapted to support a first end of the valve shaft and a second shaft support carrying a second bushing adapted to support a second end of the valve shaft; and
a first seal carried in the first shaft support between the first bushing and the valve, a second seal carried in the second shift support between the second bushing and the valve, and a third seal carried in the second shaft support between the second bushing and the second seal.

29. A product as set forth in claim 28 wherein the second shaft support includes a vent passage transversely extending therethrough in fluid communication between the outside of the module housing and a location in the second shaft support between the second and third shaft seals to cool the valve shaft and vent any gas leaking through the second shaft seal.

30. A product as set forth in claim 29 wherein the valve shaft includes at least one relief corresponding to the vent passage.

31. A product as set forth in claim 30 wherein the vent passage is in fluid communication with the insulating void, and the at least one relief includes at least one of a groove, step, or undercut.

32. A product as set forth in claim 29 wherein the vent passage is disposed at a portion of the module housing outside of the insulating void.

33. A product for a combustion engine breathing system valve module, comprising:
a module housing including a valve assembly housing, an actuator assembly housing defining a prime mover pocket, and an insulating void constructed and arranged to limit the transfer of heat between the valve assembly housing and the prime mover pocket, the insulating void being formed through the module, housing wherein the insulating void has a first opening and a second opening and formed through the module housing such that all the air entering the first opening must exit the second opening.

34. A product as set forth in claim 33 wherein the valve assembly housing at least partially defines a gas flow passage, and the module housing further includes a web between the valve assembly housing and the actuator assembly housing, wherein the insulating void extends beneath the web.

35. A product as set forth in claim 33 wherein the insulating void is open-ended such that air may flow through the insulating void.

36. A product as set forth in claim 33 wherein the insulating void is arcuately shaped to follow the contour of the gas flow passage.

37. A product as set forth in claim 33 wherein the module housing includes a valve assembly housing that defines a gas flow passage extending therethrough.

38. A product as set forth in claim 33 wherein the valve assembly housing includes at least one transversely extending shaft support including a vent passage transversely extending therethrough.

39. A product comprising:
a combustion engine breathing system valve module comprising a valve assembly housing including a gas flow passage and one or more recessed surfaces in the gas flow passage, a valve positioned within the gas flow passage, a prime mover operatively coupled to the valve to move the valve for controlling flow of gas through the gas flow passage, and a vale sleeve disposed in the gas flow passage and including an inner surface defining a valve passage in which the valve is disposed and an outer surface defining insulating voids in combination with the recessed surface(s).

40. A product as set forth in claim 39 wherein the recessed surface(s) is substantially straight.

41. A product as set forth in claim 39 wherein the recessed surface(s) is arcuately contoured.

42. A product as set forth in claim 41 wherein the valve assembly housing includes an insulating void extending therethrough and the vent passage is disposed at a portion of the module housing outside of the insulating void.

43. A product as set forth in claim 41 wherein the valve shaft includes at least one relief corresponding to the vent passage.

44. A product as set forth in claim 43 wherein the at least one relief at least one of a groove step, or undercut.

45. A product as set forth in claim 41 further comprising another shaft support transversely, extending from the valve body and carrying a portion of the valve shaft and a shaft seal and a bushing, wherein the shaft support includes a vent passage transversely extending therethrough in fluid communication between the outside of the module housing and a location within the shaft support between the shaft seal and the bushing to cool the valve shaft and relieve pressure.

46. A product comprising:
 a combustion engine breathing system valve module comprising:
  a valve assembly including a valve carried by a valve shaft to control flow of gas through the valve module;
  an actuator assembly including a prime mover to actuate the valve via the valve shaft; and
  a module housing to support the valve and actuator assemblies, wherein the module housing includes,
  a valve assembly housing including:
   opposed mounting flanges,
   an insulating void extending therethrough:
   a valve body extending between the opposed mounting flanges and defining a gas flow passage longitudinally extending therethrough; and
   a shaft support transversely extending from the valve body and carrying a portion of the valve shaft and at least two shaft seals, wherein the shaft support includes a vent passage transversely extending therethrough in fluid communication between the outside of the module housing and a location within the shaft support between the shaft seals to cool the valve shaft and vent any leakage of gas through the shaft seals and wherein the vent passage is in fluid communication with the insulating void.

* * * * *